(12) United States Patent
Sugiura (10) Patent No.: US 10,103,376 B2
(45) Date of Patent: Oct. 16, 2018

(54) STACKED ALL-SOLID-STATE BATTERY (71) Applicant: TOYOTA JIDOSHA KABUSHIKI KAISHA, Toyota-shi, Aichi-ken (JP)

(72) Inventor: Koichi Sugiura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 131 days.

(21) Appl. No.: 15/298,838

(22) Filed: Oct. 20, 2016

(65) Prior Publication Data

US 2017/0162854 A1 Jun. 8, 2017

(30) Foreign Application Priority Data

Dec. 2, 2015 (JP) ................................. 2015-236089

(51) Int. Cl.
| | |
|---|---|
| *H01M 2/34* | (2006.01) |
| *H01M 2/26* | (2006.01) |
| *H01M 10/0585* | (2010.01) |
| *H01M 10/052* | (2010.01) |
| *H01M 10/0562* | (2010.01) |

(52) U.S. Cl.
CPC ............ *H01M 2/348* (2013.01); *H01M 2/266* (2013.01); *H01M 2/34* (2013.01); *H01M 10/052* (2013.01); *H01M 10/0562* (2013.01); *H01M 10/0585* (2013.01); *H01M 2200/103* (2013.01); *H01M 2220/20* (2013.01)

(58) Field of Classification Search
CPC ........ H01M 2/348; H01M 2/266; H01M 2/34; H01M 10/052; H01M 10/0562; H01M 10/0585; H01M 2200/103; H01M 2220/20

See application file for complete search history.

(56) References Cited

U.S. PATENT DOCUMENTS

| | | | | |
|---|---|---|---|---|
| 4,188,460 | A * | 2/1980 | Kang | ..................... H01M 2/348 429/7 |
| 7,604,895 | B2 | 10/2009 | Kim et al. | |
| 2010/0021821 | A1* | 1/2010 | Kim | ................... H01M 10/4235 429/231.95 |
| 2012/0114981 | A1* | 5/2012 | Cho | ....................... H01M 10/42 429/8 |
| 2015/0357622 | A1* | 12/2015 | Mune | ..................... H01G 11/50 429/163 |

FOREIGN PATENT DOCUMENTS

| | | |
|---|---|---|
| JP | 2004-311073 A | 11/2004 |
| JP | 4554676 B2 | 9/2010 |
| JP | 2015-018710 A | 1/2015 |

* cited by examiner

*Primary Examiner* — Gregg Cantelmo
(74) *Attorney, Agent, or Firm* — Oliff PLC (57) ABSTRACT

A stacked all-solid-state battery includes: a stacked body including stacked power generation elements each having a cathode current collector layer and so on; and an antecedent short circuit layer arranged outside the stacked body. In the battery, at least one of the cathode current collector layer and the anode current collector layer includes a fuse portion that fuses by overcurrent, the antecedent short circuit layer includes a first metal layer, a second metal layer and an aluminum layer provided between the first and second metal layers and including an oxide film on its surface; the elements have a parallel connection to each other, and the first and second metal layers are respectively and electrically connected with the cathode and anode current collector layers.

7 Claims, 7 Drawing Sheets

STACKED ALL-SOLID-STATE BATTERY

TECHNICAL FIELD

The present disclosure relates to stacked all-solid-state batteries.

BACKGROUND

There is a known technique of providing a fuse portion that fuses by overcurrent, to a cathode current collector or anode current collector in a stacked all-solid-state battery, as disclosed in Patent Literature 1. It is considered that the safety when a short circuit occurs is further increased with this technique.

A technique of providing, separately from a cathode and anode, an electrode for short circuit to a stacked all-solid-state battery is also known, as disclosed in Patent Literature 2. It is considered that, with this technique, it is possible to immediately generate a short circuit to lower the battery voltage, when the battery case is crushed or a nail gets stuck in the battery.

Further, a technique of providing, as an electrode layer of an outermost layer in a stacked battery, a cathode not coated with an active material, an anode not coated with an active material, and a separator of low fracture energy provided between the cathode and the anode, is known as disclosed in Patent Literature 3. It is considered that it is possible to induce a short circuit at the outermost layer on an outer shock, whereby it is possible to promote heat release of the stacked battery while lowering the voltage of the stacked battery.

CITATION LIST

Patent Literatures

Patent Literature 1: JP 2004-311073 A
Patent Literature 2: JP 2015-018710 A
Patent Literature 3: JP 4554676 B

SUMMARY

Technical Problem

In the stacked all-solid-state battery disclosed in Patent Literature 1, the fuse portion is formed of a part of the cathode current collector or the anode current collector being changed in shape (for example, changed thinner in thickness or width) to make the cross sectional area small. This makes it possible to fuse the fuse portion by overcurrent, when the overcurrent is generated by a short circuit occurred in the stacked all-solid-state battery by a nailing test for example. However, when the fuse portion is formed of a part of the current collector whose cross sectional area is made small as disclosed in Patent Literature 1, a problem arises that the resistance of the current collector increases and the output of the battery degrades. This problem cannot be solved even by a person skilled in the art referring to Patent Literatures 1 to 3.

In addition, in a stacked all-solid-state battery formed of a plurality of power generation elements (single batteries) stacked with each other, if a short circuit is made in one of the power generation elements by a nailing test, electrons flow into the power generation element, from the rest of the power generation elements. The amount of the electrons to flow into the power generation element increases as the number of the stacked power generation elements increases. As a result, there is a problem that Joule heat when the battery has a short circuit gets large. This problem cannot be solved even by a person skilled in the art referring to Patent Literatures 1 to 3.

Considering the above, disclosed in the present disclosure is a stacked all-solid-state battery that can inhibit the lowering of output of the battery, and at the same time can hold down Joule heat when the stacked all-solid-state battery has a short circuit by an external stress such as nailing.

Solution to Problem

The present disclosure discloses, as a means for solving the above problems, a stacked all-solid-state battery including: a stacked body including a plurality of power generation elements stacked with each other; and an antecedent short circuit layer arranged outside the stacked body, wherein: each of the plurality of power generation elements includes a cathode current collector layer, a cathode material layer, a solid electrolyte layer, an anode material layer, and an anode current collector layer stacked with each other; at least one of the cathode current collector layer and the anode current collector layer includes a fuse portion that fuses by overcurrent; the antecedent short circuit layer includes a first metal layer, a second metal layer, and an aluminum layer provided between the first metal layer and the second metal layer, the aluminum layer including an oxide film on its surface; the power generation elements are electrically connected to each other in parallel; the first metal layer is electrically connected with the cathode current collector layer; and the second metal layer is electrically connected with the anode current collector layer.

"Stacked body including a plurality of power generation elements stacked with each other" includes a stacked body including a plurality of power generation elements stacked in a manner to directly have contact to each other, and a stacked body including a plurality of power generation elements stacked with each other and also including some additional kind of layer (e.g. insulation layer) or gap (e.g. air layer) between one or more of the plurality of power generation elements.

"Antecedent short circuit layer" means a layer that can have a short circuit before the stacked body does, because the layer is on an outer side of the stacked body and a nail gets stuck in the layer before it gets stuck in the stacked body. It is noted that, in normal use of the battery, "antecedent short circuit layer" does not have a short circuit (that is, the first metal layer and the second metal layer are insulated by an oxide film).

"At least one of the cathode current collector layer and the anode current collector layer includes a fuse portion that fuses by overcurrent" includes a configuration that at least one of the cathode current collector layer and the anode current collector layer is integrally provided with a fuse portion, for example by change of the shape of the current collector layers, and a configuration that at least one of the cathode current collector layer and the anode current collector layer includes the fuse portion as a separate body made of a different material from the current collector layers.

In the stacked all-solid-state battery of the present disclosure, a stacking direction of the cathode current collector layer, the cathode material layer, the solid electrolyte layer, the anode material layer, and the anode current collector layer in each of the plurality of power generation elements, a stacking direction of the plurality of power generation elements in the stacked body, a stacking direction of the first metal layer, the aluminum layer, and the second metal layer in the antecedent short circuit layer, and a stacking direction of the stacked body and the antecedent short circuit layer may be the same. This is because a further remarkable effect is obtained.

In the stacked all-solid-state battery of the present disclosure, outer edges of the cathode material layer, the solid electrolyte layer, and the anode material layer may be located on an inner side than an outer edge of the antecedent short circuit layer. In this way, by using an antecedent short circuit layer having a large area, a further remarkable effect is obtained.

In the stacked all-solid-state battery of the present disclosure, the first metal layer may include the same material as a material constituting the cathode current collector layer, and the second metal layer may include the same material as a material constituting the anode current collector layer. This is because the effect of cost reduction etc. is obtained by unifying the structuring materials.

Advantageous Effects of Invention

In the stacked all-solid-state battery having the above structure, the antecedent short circuit layer has a small resistance when a short circuit occurs. Therefore, when a short circuit occurs at the antecedent short circuit layer in a nailing test, a large sneak current is generated from each of the power generation elements to the antecedent short circuit layer, and large current flows in the fuse portion. By the large current, the fuse portion is easily fused. In other words, it is possible to properly fuse the fuse portion in a nailing test, without making the cross sectional area of the fuse portion small like before. As such, it is possible to make the cross sectional area of the fuse portion large, to make the resistance of the fuse portion small, and to inhibit the lowering of output of the battery.

In the stacked all-solid-state battery having the above structure, the antecedent short circuit layer has a short circuit before one of the power generation elements does, and the fuse portion is immediately fused, in a nailing test. Therefore, it is possible to inhibit the flow of electrons to the power generation element from the rest of the power generation elements. As a result, it is possible to hold down the Joule heat of the battery in the nailing test.

As described above, according to the present disclosure, it is possible to provide a stacked all-solid-state battery that can inhibit the lowering of output of the battery, and at the same time can hold down Joule heat when the stacked all-solid-state battery has a short circuit due to an external stress such as nailing.

DESCRIPTION OF EMBODIMENTS

1. Stacked all-Solid-State Battery

Figure 1:
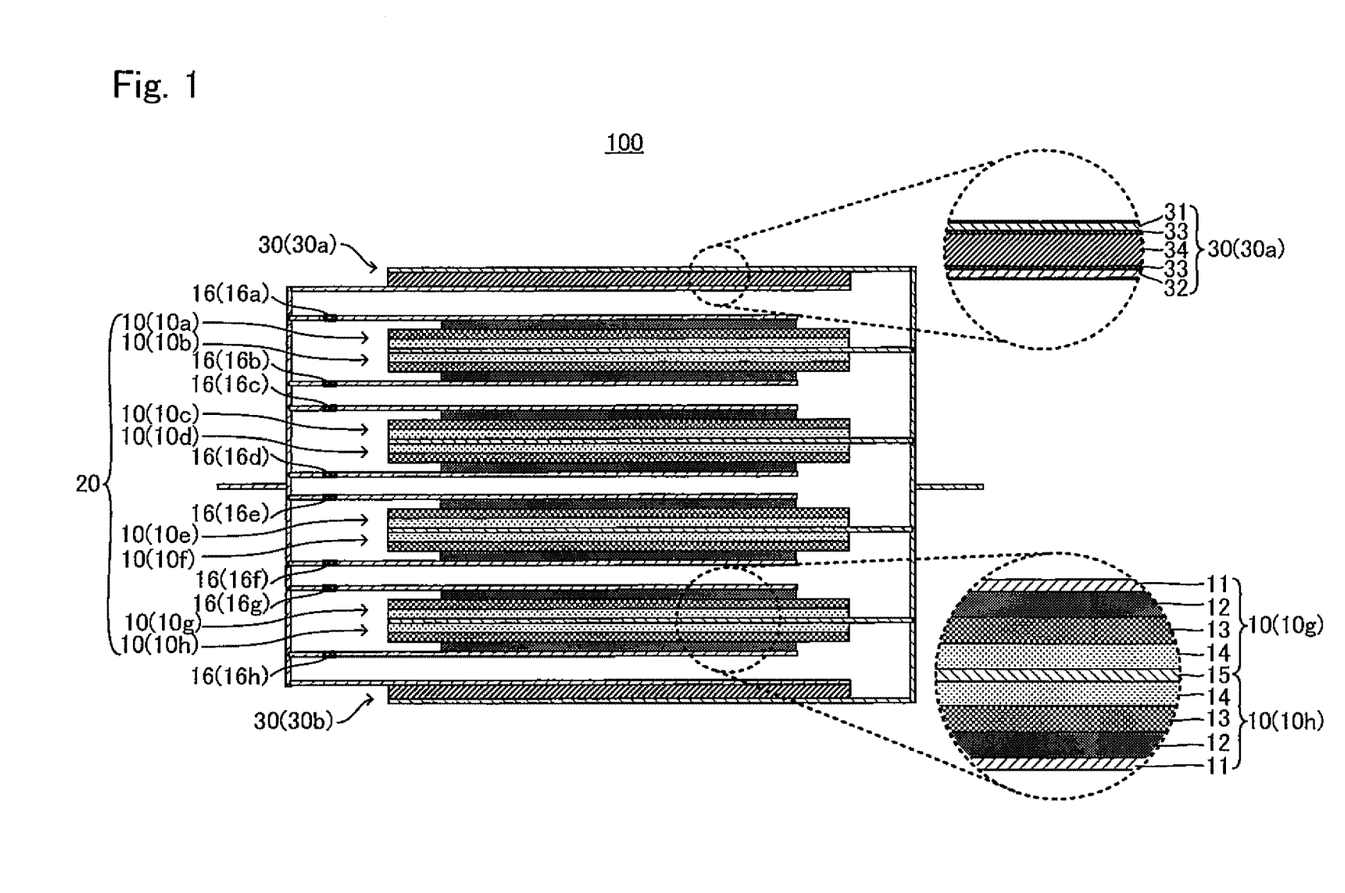
FIG. 1 is a schematic view to explain a stacking structure of a stacked all-solid-state battery 100.

FIG. 1 is a view schematically showing the layer structure of a stacked all-solid-state battery 100 according to one embodiment. In FIG. 1, the battery case etc. are not drawn for convenience of explanation.

As shown in FIG. 1, the stacked all-solid-state battery 100 includes: a stacked body 20 including a plurality of power generation elements 10, 10, 10 . . . stacked with each other; and at least one antecedent short circuit layer 30 provided outside the stacked body 20, wherein: a cathode current collector layer 11, a cathode material layer 12, a solid electrolyte layer 13, an anode material layer 14, and an anode current collector 15 are stacked in each power generation element 10; at least one of the cathode current collector layer 11 and the anode current collector layer 15 (in FIG. 1, only the cathode current collector layer 11) includes a fuse portion 16 that fuses by overcurrent; the antecedent short circuit layer 30 includes a first metal layer 31, a second metal layer 32, and an aluminum layer 34 provided between the first metal layer 31 and the second metal layer 32, the aluminum layer including an oxide film 33 on its surface; the power generation elements 10, 10, 10 . . . are electrically connected to each other in parallel; the first metal layer 31 is electrically connected with the cathode current collector layer 11; and the second metal layer 32 is electrically connected with the anode current collector layer 15.

1.1. Power Generation Element 10

Each power generation element 10 is formed of the cathode current collector layer 11, the cathode material layer 12, the solid electrolyte layer 13, the anode material layer 14, and the anode current collector layer 15, stacked with each other. That is, the power generation element 10 can function as a single battery.

1.1.1. Cathode Current Collector Layer 11

The cathode current collector layer 11 may be formed of a metal foil, a metal mesh, and the like. Especially, it may be formed of a metal foil. When a metal foil is used as the cathode current collector layer 11, the fuse portion 16 which is described later may be easily provided by change of the shape of the metal foil. The thickness of the cathode current collector layer 11 is not particularly limited. Examples of the metal that forms the cathode current collector layer 11 include Cu, Ni, Al, Fe and Ti.

1.1.2. Cathode Material Layer 12

The cathode material layer 12 at least includes an active material, and optionally includes a solid electrolyte, a binder, and a conductive assistant. Known active materials may be used for the active material. Among the known active materials, two materials having different electric potentials (charge-discharge potential) at which a predetermined kind of ions are stored and discharged may be selected, and from the two materials, the material showing a nobler potential may be used as a cathode active material, and the material showing a baser potential may be used as the anode active material described later. For example, in making a lithium battery, a lithium compound such as $LiNi_{1/3}Co_{1/3}Mn_{1/3}O_2$ may be used as the cathode active material. The surface of the cathode active material may be coated with an oxide layer such as a lithium niobate layer. For the solid electrolyte, an inorganic solid electrolyte may be used. This is because inorganic solid electrolytes have higher ion conductivities and better heat resistance properties, compared to organic polymer electrolytes. Examples of the solid electrolyte include oxide solid electrolytes such as $Li_3PO_4$, and sulfide solid electrolytes such as $Li_2S$—$P_2S_5$. Specifically, sulfide solid electrolytes including $Li_2S$—$P_2S_5$ may be used, and sulfide solid electrolytes including no less than 50 mol % of $Li_2S$—$P_2S_5$ may be used. For the binder, various types of binders may be used, such as butadiene rubber (BR), acrylate butadiene rubber (ABR), and polyvinylidene fluoride (PVdF). For the conductive assistant, carbon materials such as acetylene black and Ketjen black, and metal materials such as nickel, aluminum, and stainless steel may be used. The content of each component of the cathode material layer 12 may be the same as before. The shape of the cathode material layer 12 may also be the same as before. Specifically, in view of easily forming the stacked all-solid-state battery 100, the cathode material layer 12 may be formed in a sheet. When the cathode material layer 12 is formed in a sheet, the thickness of the cathode material layer 12 may be in the range of from 0.1 μm to 1 mm, and may be in the range of from 1 μm to 100 μm, for example.

1.1.3. Solid Electrolyte Layer 13

The solid electrolyte layer 13 includes a solid electrolyte and optionally includes a binder. For the solid electrolyte, inorganic solid electrolytes described above may be used. For the binder, the same binder as that for the cathode material layer 12 may be adequately chosen to be used. The content of each component of the solid electrolyte layer 13 may be the same as before. The shape of the solid electrolyte layer 13 may also be the same as before. Specifically, in view of easily forming the stacked all-solid-state battery 100, the solid electrolyte 13 may be formed in a sheet. When the solid electrolyte layer 13 is formed in a sheet, the thickness of the solid electrolyte layer 13 may be in the range of from 0.1 μm to 1 mm, and may be in the range of from 1 μm to 100 μm, for example.

1.1.4. Anode Material Layer 14

The anode material layer 14 at least includes an active material, and optionally includes a solid electrolyte, a binder, and a conductive assistant. Known active materials may be used for the active material. Among the known active materials, two materials having different electric potentials (charge-discharge potential) at which a predetermined kind of ions are stored and discharged may be selected, and from the two materials, the material showing a nobler potential may be used as the above-described cathode active material, and the material showing a baser potential may be used as an anode active material. For example, in making a lithium ion battery, carbon materials such as graphite, various types of oxides, metal lithium, and lithium alloys may be used as the anode active material. For the solid electrolyte, binder, and conductive assistant, the same materials as that used in the cathode material layer 12 may be adequately chosen to be used. The content of each component of the anode material layer 14 may be the same as before. The shape of the anode material layer 14 may also be the same as before. Specifically, in view of easily forming the stacked all-solid-state battery 100, the anode material layer 14 may be formed in a sheet. When the anode material layer 14 is formed in a sheet, the thickness of the anode material layer 14 may be in the range of from 0.1 μm to 1 mm, and may be in the range of from 1 μm to 100 μm. The thickness of the anode material layer 14 may be determined in such a manner that the capacity of the anode is larger than that of the cathode.

1.1.5. Anode Current Collector Layer 15

The anode current collector layer 15 may be formed of a metal foil, metal mesh, and the like. Specifically, it may be formed of a metal foil. The thickness of the anode current collector layer 15 is not particularly limited. When a metal foil is used as the anode current collector layer 15, the fuse portion 16 which is described later may be easily provided by change of the shape of the metal foil. Examples of the metal that forms the anode current collector layer 15 include Cu, Ni, Al, Fe and Ti.

1.1.6. Fuse Portion 16

In the stacked all-solid-state battery 100, at least one of the cathode current collector layer 11 and the anode current collector layer 15 (in FIG. 1, only the cathode current collector layer 11) includes the fuse portion 16 that fuses by overcurrent. The fuse portion 16 may be formed by change of the shapes of the cathode current collector layer 11 and the anode current collector layer 15. For example, it is possible to provide the fuse portion 16 to the cathode current collector layer 11 and the anode current collector layer 15, by forming the cathode current collector layer 11 and the anode current collector layer 15 by metal foils, and making a part of the cross sectional areas of the metal foils small (thin in width or thickness). Or, it is also possible to form the fuse portion 16 by connection of a material different from the materials of the cathode current collector layer 11 and the anode current collector layer 15 (e.g. Co and Pb) to the cathode current collector layer 11 and the anode current collector layer 15. Here, as described later, in the stacked all-solid-state battery 100, a predetermined antecedent short circuit layer 30 is provided outside the stacked body 20, and the fuse portion 16 can be easily fused without making the cross sectional area of the fuse portion 16 small as before, because the current to flow into the fuse portion 16 when the antecedent short circuit layer 30 has a short circuit is extremely large.

1.2. Stacked Body 20

The stacked body 20 is formed of a plurality of power generation elements 10, 10, 10 . . . stacked with each other. The number of the stacked power generation elements 10, 10, 10 . . . is not particularly limited, and can be adequately determined depending on the aimed output of the battery. In the stacked body 20, the plurality of power generation elements 10, 10, 10 . . . may be stacked in a manner to have direct contact to each other, and may be stacked with additional layers (for example insulation layer) or gaps (air layer) between one or more power generation elements. In FIG. 1, for convenience of explanation, gaps are provided between a power generation element 10b and a power generation element 10c, between a power generation element 10d and a power generation element 10e, and between a power generation element 10f and a power generation 10g, respectively. However, the gaps do not have to be provided between the plurality of power generation elements 10, 10, 10 . . . . In view of improving the output density of the battery, the plurality of power generation elements 10, 10, 10 . . . may be stacked in a manner to have direct contact to each other. In addition, as shown in FIG. 1, in the stacked all-solid-state battery 100, the stacking direction of the plurality of power generation elements 10, 10, 10 . . . in the stacked body 20 may coincide with the stacking direction of each of the layers 11 to 15 in each of the power generation elements 10, 10, 10 . . . . This is because a further remarkable effect is obtained.

1.3. Antecedent Short Circuit Layer 30

The antecedent short circuit layer 30 is a layer that can have a short circuit by an external stress such as nailing, before the stacked body 20 does. The antecedent short circuit layer 30 includes the first metal layer 31, the second metal layer 32, and an aluminum layer 34 provided between the first metal layer 31 and the second metal layer 32, the aluminum layer including an oxide film 33 on its surface. In the antecedent short circuit layer 30 having such a structure, the first metal layer 31 and the second metal layer 32 are properly insulated by the oxide film 33 in normal use of the battery. Meanwhile, the current resistance gets extremely small when a short circuit occurs by a nailing and the like.

1.3.1. First Metal Layer 31

The first metal layer 31 may be formed of a metal foil, metal mesh, and the like. Specifically, it may be formed of a metal foil. Examples of the metal that forms the first metal layer 31 include Cu, Ni, Al, Fe and Ti. Specifically, the first metal layer 31 may include the same material as the cathode current collector layer 11, and the first metal layer 31 may be formed of the substantially same material as the cathode current collector layer 11. For example, when an aluminum foil is used as the cathode current collector layer 11, an aluminum foil may be used as the first metal layer 31. This is because the effects of reducing cost etc. are obtained by uniformed constituent material.

1.3.2. Second Metal Layer 32

The second metal layer 32 may be formed of a metal foil, metal mesh, and the like. Specifically, it may be formed of a metal foil. Examples of the metal that forms the second metal layer 32 include Cu, Ni, Al, Fe and Ti. Specifically, the second metal layer 32 may include the same material as the anode current collector layer 15, and the second metal layer 32 may be formed of the substantially same material as the anode current collector layer 15. For example, when a copper foil is used as the anode current collector layer 15, a copper foil may be used as the second metal layer 32. This is because the effects of reducing cost etc. are obtained by uniformed constituent material.

1.3.3. Aluminum Layer 34 Including Oxide Film 33 on its Surface

In the stacked all-solid-state battery 100, by providing the aluminum layer 34 including the oxide film 33 on its surface, between the first metal layer 31 and the second metal layer 32, it is possible to properly insulate the first metal layer 31 and the second metal layer 32 in normal use of the battery. The oxide film 33 is a film of aluminum oxide. The aluminum layer 34 including the oxide film 33 on its surface may be easily obtained by formation of an anodic oxidation film on the surface of an aluminum foil by alumite treatment for example. In this case, the thickness of the oxide film 33 may be in the range of from 0.01 µm to 5 µm. The lower limit of the thickness may be no less than 0.1 µm, and the upper limit may be no more than 1 µm. Meanwhile, the total thickness of the oxide film 33 and the aluminum layer 34 may be in the range of from 1 µm to 100 µm. The lower limit of the total thickness may be no less than 5 µm, and may be no less than 10 µm. The upper limit may be no more than 100 µm, and may be no more than 50 µm. With the thicknesses of the oxide film 33 and the aluminum layer 34 in these ranges, it is possible to more properly insulate the first metal layer 31 and the second metal layer 32 in normal use of the battery, and to make an internal short circuit by more proper electrical connection of the first metal layer 31 and the second metal layer 32, by their deformation due to external stress such as nailing.

1.4. Arrangement of Power Generation Element, Stacked Body and Antecedent Short Circuit Layer 1.4.1. Electrical Connection of Power Generation Elements In the stacked all-solid-state battery 100, the power generation elements 10, 10, 10 . . . have an electrically parallel connection to each other. In the power generation elements having an electrically parallel connection, when one power generation element has a short circuit, electrons concentrate to the power generation element from the other power generation elements. As such, Joule heat easily gets large when a short circuit occurs in the battery. In other words, a further remarkable effect is obtained in the stacked all-solid-state battery 100 including the power generation elements 10, 10, 10 . . . connected to each other in parallel like the above. As the material to electrically connect the power generation elements 10, 10, 10 . . . , known materials may be used. For example, the power generation elements 10, 10, 10 . . . may be easily connected by means of terminals and the like.

1.4.2. Electrical Connection of Antecedent Short Circuit Layer and Power Generation Element In the stacked all-solid-state battery 100, the first metal layer 31 of the antecedent short circuit layer 30 is electrically connected to the cathode current collector layer 11 of each power generation element 10, and the second metal layer 32 of the antecedent short circuit layer 30 is electrically connected to the anode current collector layer 15 of each power generation element 10. By electrically connecting the antecedent short circuit layer 30 and the power generation elements 10, 10, 10 . . . like this, it is possible to generate a large sneak current from the power generation elements 10, 10, 10 . . . to the antecedent short circuit layer 30 when a short circuit occurs in the antecedent short circuit layer 30, and to properly fuse the fuse portion 16, as described above.

1.4.3. Positional Relationship of Power Generation Element, Stacked Body and Antecedent Short Circuit Layer A short circuit of the battery due to nailing easily occurs when a nail gets stuck into the battery in a direction from the cathode current collector layer 11 to the anode current collector layer 15 of the power generation element 10 (or from the anode current collector layer 15 to the cathode current collector layer 11). That is, in the stacked all-solid-state battery 100, the direction of nailing may be conformed to the stacking direction of each layer. More specifically, in the stacked all-solid-state battery 100, the stacking direction of the cathode current collector layer 11, the cathode material layer 12, the solid electrolyte layer 13, the anode material layer 14, and the anode current collector layer 15 of each power generation element 10, the stacking direction of the plurality of power generation elements 10, 10, 10, . . . of the stacked body 20, the stacking direction of the first metal layer 31, the aluminum layer 34, and the second metal layer 32 in the antecedent short circuit layer 30, and the stacking direction (or arrangement direction) of the stacked body 20 and the antecedent short circuit layer 30 may be the same. A further remarkable effect is obtained by such a structure.

1.4.4. Relationship in Size of Stacked Body and Antecedent Short Circuit Layer

Figure 2:
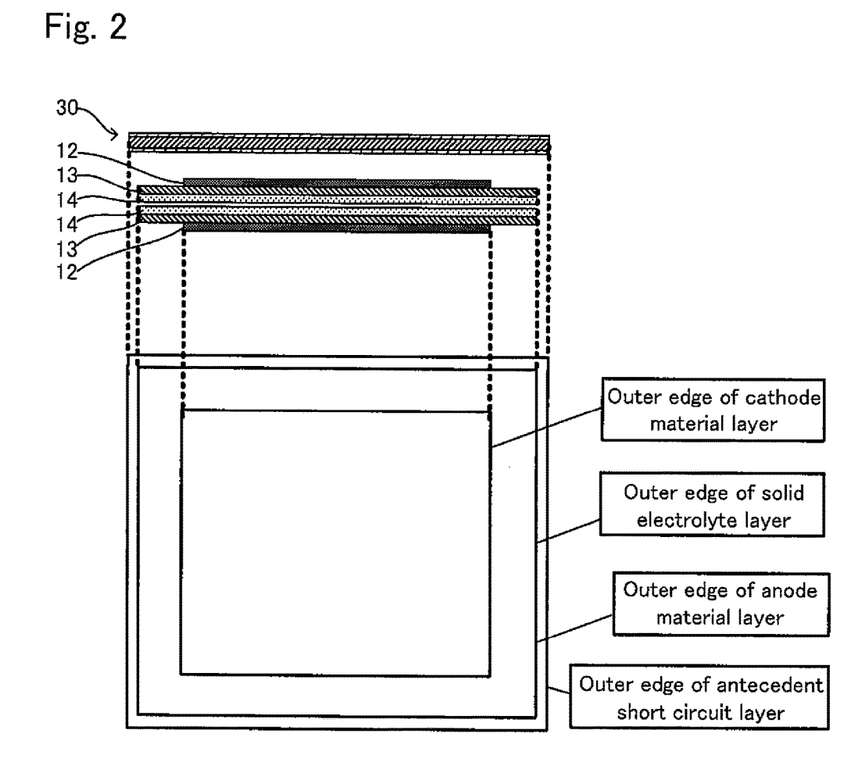
FIG. 2 is a schematic view to explain the relationship between: the sizes of a cathode material layer 12, a solid electrolyte layer 13, and an anode material layer 14; and the size of an antecedent short circuit layer 30.

In the stacked all-solid-state battery 100, it gets easier, in nailing, to make the antecedent short circuit layer 30 have a short circuit before the stacked body 20 does, by making the antecedent short circuit layer 30 cover the outer surface of the stacked body 20 as much part as possible. For example, as shown in FIG. 2, in the stacked all-solid-state battery 100, the outer edges of the cathode material layer 12, the solid electrolyte layer 13, and the anode material layer 14 are located inside the outer edge of the antecedent short circuit layer 30, when seen in the stacking direction.

1.5. Function and Effect of Stacked all-Solid-State Battery 100

Figure 3:
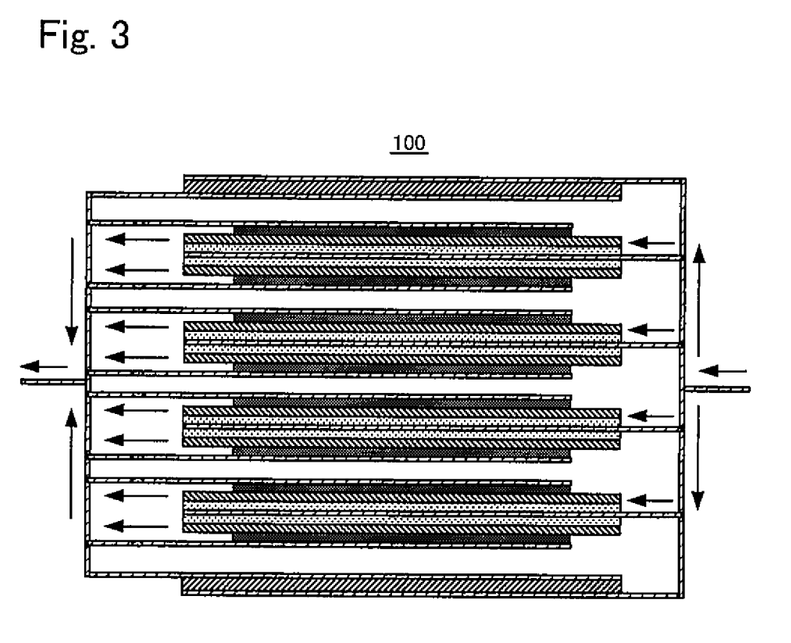
FIG. 3 is a schematic view to explain the direction of current in the stacked all-solid-state battery 100 in normal use.

FIG. 3 shows the direction of current in the stacked all-solid-state battery 100 in normal use. In normal use of the battery, the first metal layer 31 and the second metal layer 32 of the antecedent short circuit layer 30 are insulated by the oxide film 33. Thus, current flows from the power generation elements 10, 10, 10, . . . of the stacked all-solid-state battery 100 to the outside, via a cathode terminal. And from the outside, current flows to the power generation elements 10, 10, 10, . . . via an anode terminal. The current flowing this time is low in a range of normal use, and the fuse portion 16 does not fuse by the current.

Figure 4:
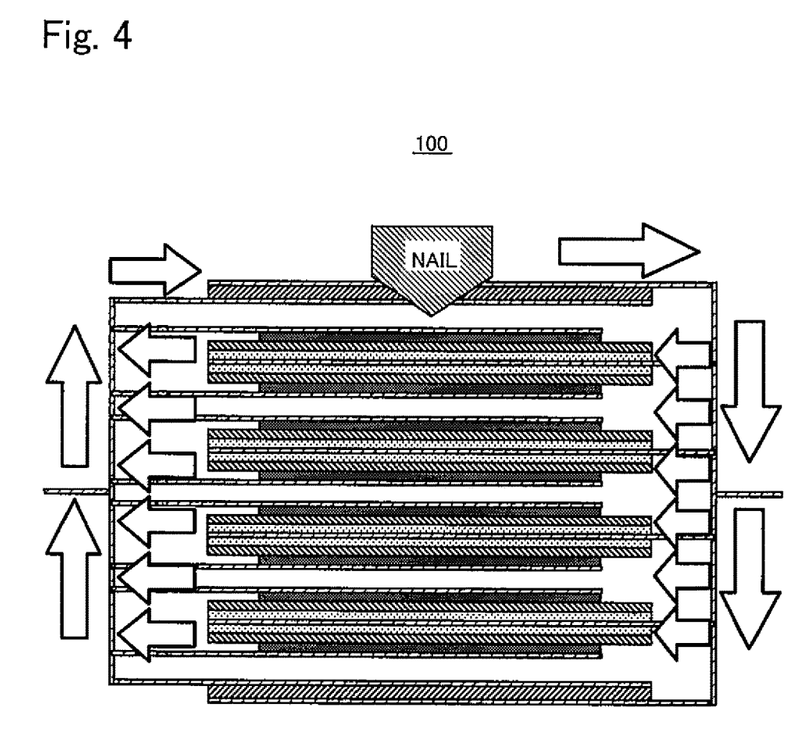
FIG. 4 is a schematic view to explain the direction of current in the stacked all-solid-state battery 100 when an antecedent short circuit layer has a short circuit in a nailing test.
Figure 5:
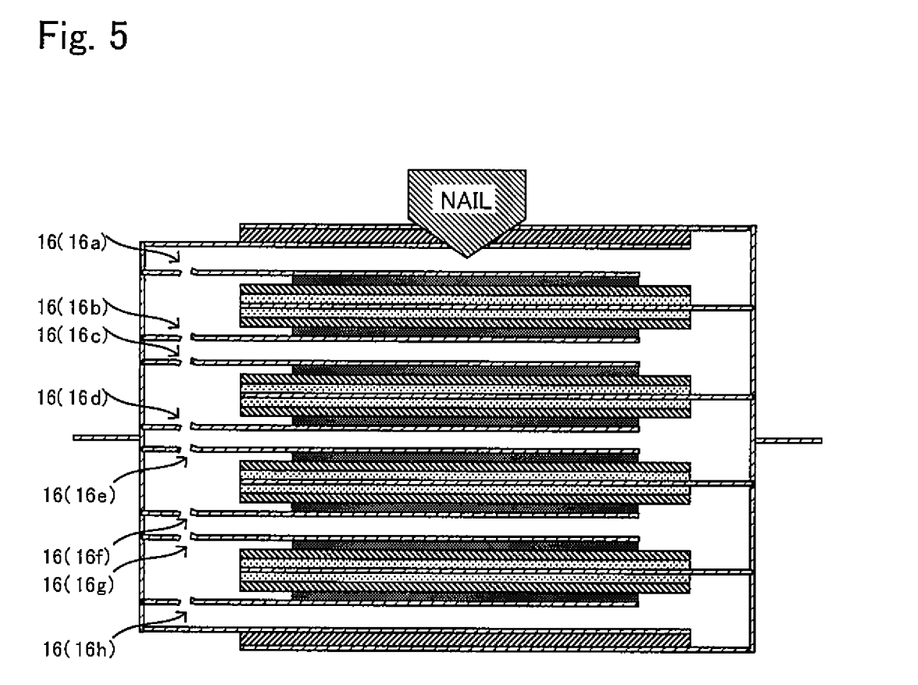
FIG. 5 is a schematic view to explain a state of the stacked all-solid-state battery 100 after a nailing test.

FIG. 4 shows the direction of current in the stacked all-solid-state battery 100 when the antecedent short circuit layer 30 has a short circuit due to an external stress such as nailing. When the antecedent short circuit layer 30 is deformed by an external stress such as nailing, the oxide film 33 breaks, and the first metal layer 31 and the second metal layer 32 get electrically connected via the aluminum layer 34. Or, a nail penetrates from the first metal layer 31 to the second metal layer 32, whereby the first metal layer 31 and the second metal layer 32 get electrically connected via the nail and the aluminum layer 34. This makes a new circuit in the stacked all-solid-state battery 100. At this time, the electrical resistance of the antecedent short circuit layer 30 gets extremely small, and a large sneak current occurs from the power generation elements 10, 10, 10, . . . to the antecedent short circuit layer 30. That is, an extremely large current flows in the fuse portion 16, and the fuse portion 16 gets immediately fused. As a result, as shown in FIG. 4, the current from the power generation elements 10, 10, 10, . . . is shut out, whereby it is possible to inhibit the generation of Joule heat in the stacked all-solid-state battery 100. Because the current to flow into the fuse portion 16 is extremely large, it is possible to easily fuse the fuse portion 16 without making the cross sectional area of the fuse portion 16 small like before. That is, in normal use of the battery, it is possible to make the electrical resistance of the fuse portion 16 small, and to secure a high output.

According to the findings of the inventor of the present disclosure, if the intermediate layer of the antecedent short circuit layer 30 is formed of a ceramic layer or a resin film layer instead of the aluminum layer 34, the electrical resistance does not get stably small even if a short circuit occurs in the antecedent short circuit layer 30 by a nailing, and the current that flows in the fuse portion 16 gets unstable. As a result, the fuse portion 16 cannot fuse properly. In contrast, if the intermediate layer of the antecedent short circuit layer 30 is formed of the aluminum layer 34 including the oxide film 33 on its surface, the resistance of the antecedent short circuit layer 30 gets immediately and stably small when a short circuit occurs in the antecedent short circuit layer 30 by nailing. Therefore, it is possible to make large current stably flow in the fuse portion 16, to immediately fuse the fuse portion 16.

As described above, according to the stacked all-solid-state battery 100, it is possible to inhibit the lowering of output of the battery, and to inhibit Joule heat when a short circuit occurs at the stacked all-solid-state battery by an external stress such as nailing.

2. Variation of Stacked all-Solid-State Battery 100

In the above explanation, an embodiment in which two power generation elements 10, 10 share one anode current collector layer 15 is described. However, the present disclosure is not limited to this embodiment, as long as the power generation element 10 functions as a single battery, and as long as the cathode current collector layer 11, the cathode material layer 12, the solid electrolyte layer 13, the anode material layer 14 and the anode current collector 15 are stacked.

In the above explanation, an embodiment in which the stacking direction of each layer is all the same is described. However, the present disclosure is not limited to this embodiment. Combinations of the fuse portion and the antecedent short circuit layer make it possible to easily fuse the fuse portion when the antecedent short circuit layer has a short circuit. As long as this mechanism is provided, one or more of the stacking direction of the cathode current collector layer etc. in a power generation element, the stacking direction of the plurality of power generation elements in the stacked body, the stacking direction of the first metal layer etc. in the antecedent short circuit layer, and the stacking direction of the stacked body and the antecedent short circuit layer may be different from others.

In the above explanation, described is an embodiment in which the antecedent short circuit layer 30 is provided to each end of the stacked body 20 in the stacking direction of each layer. However, "outside the stacked body" is not limited to this position. The position of the antecedent short circuit layer 30 may be adequately changed, for example "the antecedent short circuit layer 30 may be provided in a manner to face the most fragile portion of the battery case (not shown) in the stacked all-solid-state battery 100".

In the above explanation, the aluminum layer 34 having the oxide film 33 on its surface forms the intermediate layer of the antecedent short circuit layer 30. However, the effect according to the present disclosure might be provided even when a metal layer having an oxide film (metal layer other than aluminum layer, for example a titanium layer) is used instead of the predetermined aluminum layer 34. However, in order to increase the output density of the battery, a uniform oxide film needs to be formed on the surface of an extremely thin metal foil. As a method of obtaining such a very thin film, an easy way is carrying out an alumite treatment on the surface of an aluminum foil. Thus, in the stacked all-solid-state battery 100, the aluminum layer 34 having the oxide film 33 on its surface is used as the intermediate layer of the antecedent short circuit layer 30.

In the above explanation, "stacked body including a plurality of power generation elements stacked with each other" is described. However, a certain degree of the effect is considered to be provided even when the power generation elements are not stacked in a plural manner in the stacked body (even when the stacked body is a single battery). However, the Joule heat described above tends to increase more in a stacked body where a plurality of power generation elements are stacked, than in a stacked body where one power generation element is stacked. That is, a more remarkable effect is provided in "a stacked body including a plurality of power generation elements stacked with each other". In this point, there is superiority of employing "a stacked body including a plurality of power generation elements stacked with each other".

In the above explanation, a "stacked all-solid-state battery" is described. However, a certain degree of the effect is considered to be provided even in a "liquid battery", by the combination of the antecedent short circuit layer and the fuse portion. However, in a liquid battery, the battery case is normally filled with an electrolyte solution, which means the electrolyte solution exists between the antecedent short circuit layer and the power generation element. Thus, it is not possible to concentrate the external stress from nailing and the like to the antecedent short circuit layer, and in some cases the antecedent short circuit layer cannot have a short circuit before the stacked body does. On the other hand, in an all-solid-state battery, an electrolyte solution does not exist between the antecedent short circuit layer and the power generation element, and the antecedent short circuit layer and the power generation element can tightly have contact to each other, by which it is easy to preferentially have a short circuit in the antecedent short circuit layer by an external stress such as nailing. In this point, there is superiority of employing a "stacked all-solid-state battery".

3. Method for Manufacturing Stacked all-Solid-State Battery

Each layer of the above-described stacked all-solid-state battery 100 may be produced by application of known methods. For example, the power generation element 10 may be produced by: applying a cathode material on the surface of the cathode current collector layer 10 by wet method then drying it, to form the cathode material layer 11; applying an anode material on the surface of the anode current collector 15 by wet method then drying it, to form the anode material layer 14; transferring the solid electrolyte layer 13 including a solid electrolyte etc. between the cathode material layer 12 and the anode material layer 14; and carrying out a press forming thereon to integrate them. The pressure in the press forming is not particularly limited, and for example it may be no less than 2 ton/cm$^2$. Here, the fuse portion 16 may be provided by carrying out a shaping etc. on at least one of the cathode current collector layer 11 and the anode current collector 15. It is possible to easily form the stacked body 20 by stacking the plurality of power generation elements 10, 10, 10 . . . produced in this manner. Meanwhile, it is possible to easily produce the antecedent short circuit layer 30, by arranging an aluminum foil on which an alumite treatment is carried out (the aluminum layer 34 having the oxide film 33 on its surface) between the first metal layer 31 and the second metal layer 32. Here, adhesives and resin may be used in order to keep the shape of the antecedent short circuit layer 30. By arranging the antecedent short circuit layer 30 outside the stacked body 20 produced as above, connecting terminals etc. to the current collectors 11 and 15 of the stacked body 20, and enclosing them in a battery case such as a laminate film and a can of stainless steel in a vacuum condition, it is possible to produce the stacked all-solid-state battery 100. It is noted that these making procedures are one example, and the stacked all-solid-state battery 100 may be made with another procedure. For example, the cathode material layer etc. may be formed by dry method, instead of a wet method.

4. Supplement Regarding Prior Art

In the above Patent Literatures 2 and 3, disclosed are embodiments in which an antecedent short circuit layer is used in a stacked battery. However, the antecedent short circuit layers disclosed in Patent Literatures 2 and 3 are provided for the purpose of degrading the voltage of the battery by preferentially having a short circuit. Therefore, if current is cut like with the fuse portion described above, the purpose of Patent Literatures 2 and 3 cannot be achieved. Therefore, it is not possible to combine the techniques disclosed in Patent Literatures 2 and 3 and the fuse portion disclosed in Patent Literature 1. In addition, in a technique of lowering the battery voltage when a short circuit occurs in the antecedent short circuit layer like Patent Literatures 2 and 3, it is considered that the larger the battery gets, the more time is required to lower the battery voltage. On the other hand, if the fuse portion is provided like in the present disclosure, current can be cut with a high responsiveness, and a sufficient effect is provided in a short time, even though the battery is large. Such an effect cannot be conceived of from Patent Literatures 1 to 3.

Examples

1. Manufacture of Stacked all-Solid-State Battery
1.1. Manufacture of Sulfide Solid Electrolyte According to the method disclosed in JP 2012-48973 A, a sulfide solid electrolyte precursor including $Li_2S$ and $P_2S_5$ was synthesized. The precursor was pulverized and crystallized, whereby a sulfide solid electrolyte (20LiBr-10LiI-70$Li_3PS_4$) was obtained.

1.2. Manufacture of Cathode Mixture Slurry

As a cathode active material, 52 g of $LiNi_{1/3}CO_{1/3}Mn_{1/3}O_2$ (manufactured by NICHIA CORPORATION) of 5 μm in average particle size (D50), 1 g of vapor grown carbon fiber VGCF as a conductive assistant (manufactured by SHOWA DENKO K.K.), 17 g of the above-described sulfide solid electrolyte, 0.6 g of PVDF as a binder (manufactured by KUREHA CORPORATION), and 15 g of butyl butyrate (manufactured by TOKYO CHEMICAL INDUSTRY CO., LTD.) were weighed and sufficiently mixed, whereby a cathode mixture slurry was made. The surface of the cathode active material was coated with $LiNbO_3$ according to the method described in JP 2010-73539 A.

1.3. Manufacture of Anode Mixture Slurry

Graphite (manufactured by Mitsubishi Chemical Corporation) in an amount of 36 g as an anode active material, 25 g of the above-described sulfide solid electrolyte, 1.3 g of PVDF as a binder (manufactured by KUREHA CORPORATION), 18 g of butyl butyrate (manufactured by TOKYO CHEMICAL INDUSTRY CO., LTD.) were weighed and sufficiently mixed, whereby an anode mixture slurry was made.

1.4. Manufacture of Power Generation Element

An aluminum foil was used as a cathode current collector, and a copper foil was used as an anode current collector. The above-described cathode mixture slurry was applied on the aluminum foil and dried. The obtained material was cut out to be a cathode (cathode current collector layer/cathode material layer). To the obtained cathode, the terminal described later was welded. In addition, the portion between the portion where the cathode material layer was applied and the weld terminal portion was shaped and punched out in a proper width and length, whereby a fuse portion was provided to the cathode. Meanwhile, the above-described anode mixture slurry was applied on the copper foil and dried. Thereafter the obtained material was cut out to be an anode (anode current collector layer/anode material layer). A solid electrolyte layer including the above-described sulfide solid electrolyte and PVDF was transferred between the obtained cathode and the anode. Then, the obtained material was pressed, whereby a power generation element was manufactured.

1.5. Manufacture of Stacked Body

Twenty of the power generation elements obtained as described above were stacked, whereby a stacked body was obtained.

1.6. Manufacture of Antecedent Short Circuit Layer

An aluminum foil was punched out in the same shape as the above-described cathode current collector layer, whereby a first metal layer was produced. A copper foil was punched in the same shape as the above-described anode current collector layer, whereby a second metal layer was produced. On the surfaces of the first and second metal layers, a few drops of butyl butyrate in which PVDF was diluted to be 5% was placed, and the intermediate layer shown in the following Table 1 was joined thereto. Thereafter, the obtained material was dried at 100° C. for 30 minutes, whereby an antecedent short circuit layer was manufactured.

TABLE 1

|  | Intermediate layer | Thickness of intermediate layer (μm) |
|---|---|---|
| Example 1 | alumite treated aluminum foil | 20 |
| Example 2 | alumite treated aluminum foil | 30 |
| Example 3 | alumite treated aluminum foil | 50 |
| Comparative Example 1 | ceramic (alumina) | 20 |
| Comparative Example 2 | ceramic (sulfur-based) | 20 |
| Comparative Example 3 | ceramic (sulfur-based) | 30 |
| Comparative Example 4 | polypropylene film | 20 |
| Comparative Example 5 | polypropylene film | 30 |
| Comparative Example 6 | silicon rubber | 50 |
| Comparative Example 7 | silicon rubber | 100 |
| Comparative Example 8 | glass cloth | 20 |
| Comparative Example 9 | polyimide film | 25 |

1.7. Manufacture of Stacked all-Solid-State Battery

The antecedent short circuit layer was stacked on each of the uppermost layer and the lowermost layer of the manufactured stacked body. A terminal was welded by ultrasonic waves to each of the current collectors of the stacked body and the metal layers of each antecedent short circuit layer. The obtained material was enclosed in a laminate film in a vacuum condition, whereby a 2 Ah stacked all-solid-state battery was obtained.

2. Evaluation of Stacked all-Solid-State Battery 2.1. Measurement of Short Circuit Resistance of Antecedent Short Circuit Layer The short circuit occurred when nailing was carried out in the stacking direction of the antecedent short circuit layer was measured with a DC ammeter connected to the first metal layer and the second metal layer of the antecedent short circuit layer. The short circuit resistance was the average value of the resistance values of 0 to 0.5 seconds immediately after the nailing. The results are shown in the following Table 2. In Table 2, Comparative Example 10 was an example where the short circuit resistance of a single layer battery was measured without providing an antecedent short circuit layer.

TABLE 2

|  | Intermediate layer | Thickness of intermediate layer (μm) | Short circuit resistance (mΩ) |
|---|---|---|---|
| Example 1 | alumite treated aluminum foil | 20 | 12.1 |
| Example 2 | alumite treated aluminum foil | 30 | 10.3 |
| Example 3 | alumite treated aluminum foil | 50 | 9.9 |
| Comparative Example 1 | ceramic (alumina) | 20 | 129.0 |
| Comparative Example 2 | ceramic (sulfur-based) | 20 | 202.0 |
| Comparative Example 3 | ceramic (sulfur-based) | 30 | 558.1 |
| Comparative Example 4 | polypropylene film | 20 | 101.0 |
| Comparative Example 5 | polypropylene film | 30 | 501.0 |

TABLE 2-continued

|  | Intermediate layer | Thickness of intermediate layer (μm) | Short circuit resistance (mΩ) |
|---|---|---|---|
| Comparative Example 6 | silicon rubber | 50 | 207.0 |
| Comparative Example 7 | silicon rubber | 100 | 413.0 |
| Comparative Example 8 | glass cloth | 20 | 66.5 |
| Comparative Example 9 | polyimide film | 25 | 135.0 |
| Comparative Example 10 | no antecedent short circuit layer | — | 632 |

Figure 6:
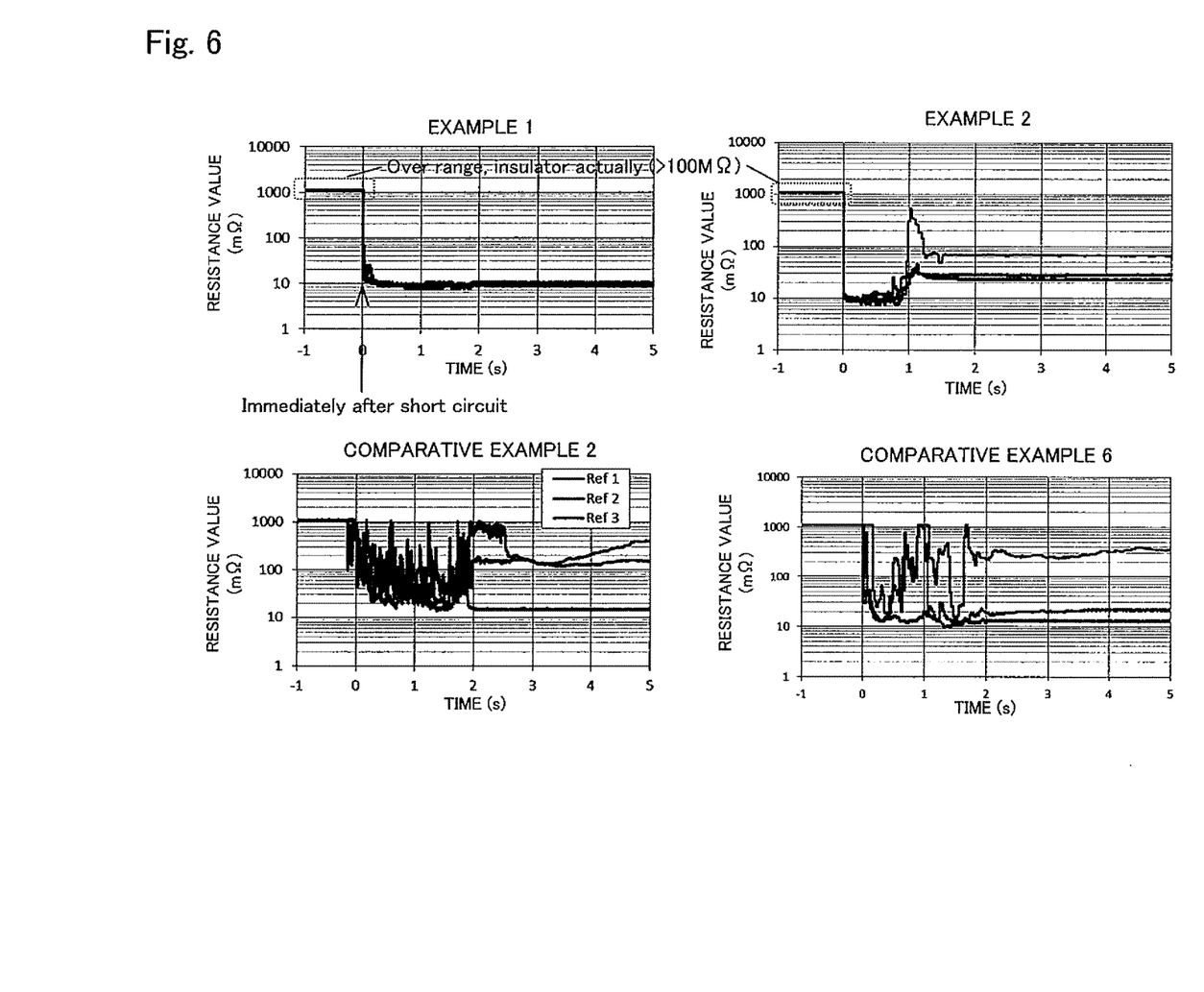
FIG. 6 is a view to show the measurement results of resistance variation of antecedent short circuit layers of Examples 1 and 2, and Comparative Examples 2 and 6, immediately after a nailing test.

FIG. 6 shows the measurement results of variations in resistance of the antecedent short circuit layers of Examples 1 and 2, and Comparative Examples 2 and 6.

As is obvious from the results shown in Table 2 and FIG. 6, when an aluminum foil whose surface was treated with alumite (aluminum layer having an oxide film on its surface) was used as the intermediate layer in the antecedent short circuit layer, it was found that the resistance of the antecedent short circuit layer immediately and stably got small immediately after a short circuit was generated by nailing. It is considered that the resistance rapidly lowered because the first and second metal layers had a conduction with each other, because the oxide film got broken by the nailing, and the nail and the first and second metal layers directly had contact to each other, or, aluminum, which was a conductive material, was positioned between the nail and the first and second metal layers.

On the other hand, as is obvious from the results shown in Table 2 and FIG. 6, when a ceramic layer or resin layer was used as the intermediate layer in the antecedent short circuit layer, it was figured out that the resistance of the antecedent short circuit layer did not get stabled even after the short circuit was generated by nailing. It is considered this is because an insulation material such as ceramic and resin was positioned between the nail and the first and second metal layers, whereby the conduction between the first metal layer and the second metal layer was obstructed.

2.2. Nailing Test on Stacked all-Solid-State Battery

A nailing test was carried out on a stacked all-solid-state battery actually including an antecedent short circuit layer and a fuse portion. The nailing test was carried out with a SK material of φ 8 mm in nail diameter and 60° in tip angle, under the conditions of 25 mm/sec of nailing speed and 25° C. of atmosphere environment. The difference (ΔT) between the maximum heat generation temperature after the nailing and the temperature before the nailing was measured. Then the cell was disassembled and the presence or absence of the cut of the fuse portion was visually observed. In addition, before the nailing test on the stacked all-solid-state battery, the constant power of the stacked all-solid-state battery was measured. The battery output was extrapolated, and converted to a predetermined area, whereby the battery output was measured. It is noted that, in the Application Example 1 and Application Comparative Examples 2 to 4 shown in the following Table 3, one of the power generation elements was not provided with a fuse portion, for a voltage profile measurement. That is, nineteen fuse portions were provided in each stacked all-solid-state battery. The evaluation results are shown in Table 3.

TABLE 3

| | Structure of stacked all-solid-state battery | | | Evaluation result | | |
|---|---|---|---|---|---|---|
| | Intermediate layer of antecedent short circuit layer | Presence or absence of fuse portion | Width of fuse portion (mm) | Output of battery (mW/cm$^2$) | Presence or absence of cut of fuse portion | Heat generation temperature $\Delta T(K)$ |
| Application Example 1 | alumite treated aluminum foil (20 μm in thickness) | with fuse portion | 5 | 51 | 19/19 | 160 |
| Application Comparative Example 1 | no antecedent short circuit layer | no fuse portion | none | 52 | — | 500 |
| Application Comparative Example 2 | no antecedent short circuit layer | with fuse portion | 5 | 51 | 0/19 | 476 |
| Application Comparative Example 3 | polypropylene film (20 μm in thickness) | with fuse portion | 5 | 50 | 0/19 | 556 |
| Application Comparative Example 4 | polypropylene film (20 μm in thickness) | with fuse portion | 1 | 43 | 17/19 | 233 |

Figure 7:
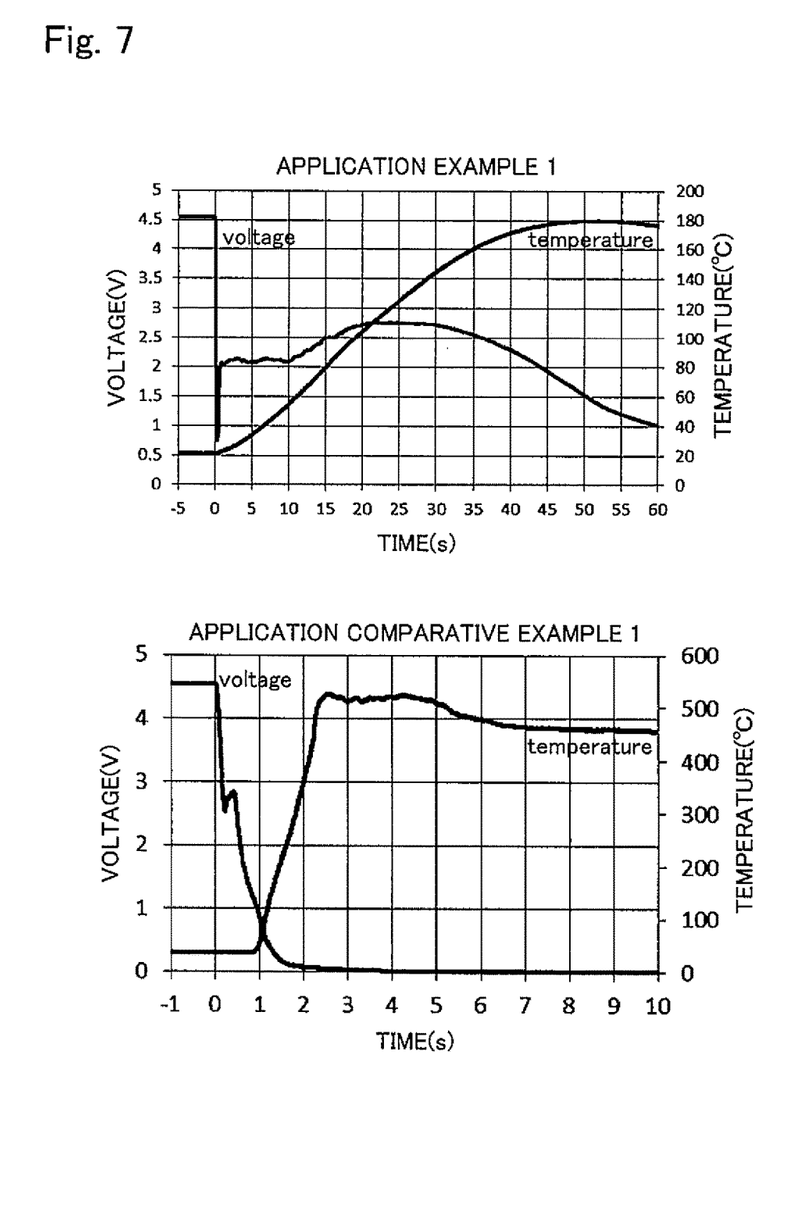
FIG. 7 is a view to show the voltage profile of stacked all-solid-state batteries of Application Example 1 and Application Comparative Example 1, before and after a nailing test.

FIG. 7 shows the voltage profiles of the stacked all-solid-state batteries of the Application Example 1 and Application Comparative Example 1 before and after the nailing test.

As is obvious from the results shown in Table 3 and FIG. 7, when an aluminum foil treated with alumite (aluminum layer having an oxide film on its surface) was used as the intermediate layer in the antecedent short circuit layer, large current flowed in the fuse portion because the resistance of the antecedent short circuit layer got immediately and stably small immediately after a short circuit occurred by nailing, whereby it was possible to immediately fuse the fuse portion. As a result, the battery voltage did not rapidly lower after the nailing, and Joule heat was able to be held down.

On the other hand, as is obvious from the results shown in Table 3 and FIG. 7, in the stacked all-solid-state battery not provided with an antecedent short circuit layer or fuse portion, one power generation element had a short circuit after the nailing, and current flowed into the power generation element that had a short circuit from the other power generation elements, whereby a large Joule heat was generated (Application Comparative Example 1). When a fuse portion was provided but a short circuit layer was not provided, and when an insulation layer (polypropylene film) was used as the intermediate layer of the antecedent short circuit layer, the resistance of the antecedent short circuit layer did not get stably small even after the nailing, and it was not able to fuse the fuse portion (Application Comparative Examples 2 and 3). In those cases, in order to fuse the fuse portion, the cross-sectional area of the fuse portion had to be small, and as a result, the output of the battery lowered (Application Comparative Example 4).

From the above results, it was figured out that it was possible to make a "stacked all-solid-state battery that can inhibit the lowering of output of the battery, and at the same time can hold down Joule heat when the stacked all-solid-state battery has a short circuit by an external stress such as nailing", by providing at least the following structures of (1) to (6):
(1) including a fuse portion that fuses by overcurrent, to at least one of the cathode current collector layer and the anode current collector of the power generation element;
(2) including an antecedent short circuit layer outside the stacked body formed of a plurality of stacked power generation elements;
(3) configuring the antecedent short circuit layer to include a first metal layer, a second metal layer, and an aluminum layer provided between the first and second metal layers and having an oxide film on its surface;
(4) electrically connecting the power generation elements in parallel;
(5) electrically connecting the first metal layer and the cathode current collector layer; and
(6) electrically connecting the second metal layer and the anode current collector layer.

INDUSTRIAL APPLICABILITY

The stacked all-solid-state battery according to the present disclosure may be suitably applied for example as an in-vehicle large size power source.

DESCRIPTION OF REFERENCE NUMERALS 10 power generation element
  11 cathode current collector layer
  12 cathode material layer
  13 solid electrolyte layer
  14 anode material layer
  15 anode current collector layer
  16 fuse portion
20 stacked body
30 antecedent short circuit layer
  31 first metal layer
  32 second metal layer
  33 oxide film
  34 aluminum layer
100 stacked all-solid-state battery

The invention claimed is:

1. A stacked all-solid-state battery comprising:
  a stacked body including a plurality of power generation elements stacked with each other; and
  an antecedent short circuit layer arranged outside the stacked body,
wherein:
  each of the plurality of power generation elements includes a cathode current collector layer, a cathode material layer, a solid electrolyte layer, an anode material layer, and an anode current collector layer stacked with each other;

wherein in each of the plurality of power generation elements, at least one of the cathode current collector layer and the anode current collector layer includes a fuse portion that fuses by overcurrent;

the antecedent short circuit layer includes a first metal layer, a second metal layer, and an aluminum layer provided between the first metal layer and the second metal layer, the aluminum layer including an oxide film on its surface;

the power generation elements are electrically connected to each other in parallel;

the first metal layer is electrically connected with the cathode current collector layer of each power generation element; and the second metal layer is electrically connected with the anode current collector layer of each power generation element.

2. The stacked all-solid-state battery according to claim 1, wherein a stacking direction of the cathode current collector layer, the cathode material layer, the solid electrolyte layer, the anode material layer, and the anode current collector layer in each of the plurality of power generation elements, a stacking direction of the plurality of power generation elements in the stacked body, a stacking direction of the first metal layer, the aluminum layer, and the second metal layer in the antecedent short circuit layer, and a stacking direction of the stacked body and the antecedent short circuit layer are the same.

3. The stacked all-solid-state battery according to claim 1, wherein outer edges of the cathode material layer, the solid electrolyte layer, and the anode material layer of each power generation element are located inside an outer edge of the antecedent short circuit layer, when viewed in a stacking direction.

4. The stacked all-solid-state battery according to claim 1, wherein the first metal layer includes the same material as a material constituting the cathode current collector layer of each power generation element, and the second metal layer includes the same material as a material constituting the anode current collector layer of each power generation element.

5. The stacked all-solid-state battery according to claim 2, wherein outer edges of the cathode material layer, the solid electrolyte layer, and the anode material layer of each power generation element are located inside an outer edge of the antecedent short circuit layer, when viewed in a stacking direction.

6. The stacked all-solid-state battery according to claim 2, wherein the first metal layer includes the same material as a material constituting the cathode current collector layer of each power generation element, and the second metal layer includes the same material as a material constituting the anode current collector layer of each power generation element.

7. The stacked all-solid-state battery according to claim 3, wherein the first metal layer includes the same material as a material constituting the cathode current collector layer of each power generation element, and the second metal layer includes the same material as a material constituting the anode current collector layer of each power generation element.

* * * * *